United States Patent [19]

Schielke

[11] Patent Number: 5,353,128
[45] Date of Patent: Oct. 4, 1994

[54] METHOD AND ARRANGEMENT FOR PRODUCING RASTERED COLOR SEPARATIONS AND PRINTING FORMS

[75] Inventor: Rainer Schielke, Fleckeby, Fed. Rep. of Germany

[73] Assignee: Linotype-Hell AG, Eschborn, Fed. Rep. of Germany

[21] Appl. No.: 108,695

[22] PCT Filed: Mar. 3, 1992

[86] PCT No.: PCT/DE92/00176
§ 371 Date: Sep. 2, 1993
§ 102(e) Date: Sep. 2, 1993

[87] PCT Pub. No.: WO92/17022
PCT Pub. Date: Oct. 1, 1992

[30] Foreign Application Priority Data

Mar. 14, 1991 [DE] Fed. Rep. of Germany ....... 4108253

[51] Int. Cl.$^5$ ............................................. H04N 1/40
[52] U.S. Cl. ..................................... 358/456; 358/460; 358/536
[58] Field of Search ............... 358/460, 456, 298, 296, 358/536, 429, 458, 459, 465

[56] References Cited

U.S. PATENT DOCUMENTS

| | | | |
|---|---|---|---|
| 3,997,911 | 12/1976 | Perriman et al. | 358/75 |
| 4,185,304 | 1/1980 | Holladay | 358/298 |
| 4,499,489 | 2/1985 | Gall et al. | 358/536 |
| 4,533,941 | 8/1985 | Keane et al. | 358/75 |
| 4,673,971 | 6/1987 | Ikuta et al. | 358/536 |

FOREIGN PATENT DOCUMENTS

| | | | |
|---|---|---|---|
| 2500564A1 | 7/1975 | Fed. Rep. of Germany | G03F 5/00 |
| 2827596 | 2/1980 | Fed. Rep. of Germany | G03F 3/00 |
| 2026283A | 1/1983 | United Kingdom | 358/456 |
| 2157119A | 10/1985 | United Kingdom | 358/456 |

*Primary Examiner*—Edward L. Coles, Sr.
*Assistant Examiner*—Jerome Grant, II
*Attorney, Agent, or Firm*—Hill, Steadman & Simpson

[57] ABSTRACT

A method and an arrangement for producing rastered printing forms having rasters with arbitrary raster angles on the basis of at least one recording beam moving across a recording medium. The recording beam is switched on or, respectively, off corresponding to the size and position of raster dots. A switch signal for the recording beam is generated by a signal comparison between the image signal, which represents the tonal values of an original, and stored raster thresholds, which represent the periodic basic structure of a raster mesh. Coordinate increments corresponding to the proceeding recording are accumulated dependent on the screen angle to form coordinate values. A plurality of most significant binary places of the coordinate values form addresses for reading out the stored raster thresholds. Random numbers are superimposed on the coordinate values.

10 Claims, 3 Drawing Sheets

| x' = x | y' | y |
|---|---|---|
| 1.0 | 0.267949 | 0 |
| 2.0 | 0.535898 | 0 |
| 3.0 | 0.803848 | 0 |
| 4.0 | 1.071797 | 1 |
| 5.0 | 1.339746 | 1 |
| 6.0 | 1.607695 | 1 |
| 7.0 | 1.875644 | 1 |
| 8.0 | 2.143594 | 2 |
| 9.0 | 2.411543 | 2 |
| 10.0 | 2.679492 | 2 |
| 11.0 | 2.947441 | 2 |
| 12.0 | 3.215390 | 3 |
| 13.0 | 3.483340 | 3 |
| 14.0 | 3.751289 | 3 |
| 15.0 | 4.019238 | 4 |
| 16.0 | 4.287187 | 4 |
| 17.0 | 4.555136 | 4 |
| 18.0 | 4.823085 | 4 |
| 19.0 | 5.091035 | 5 |
| 20.0 | 5.358984 | 5 |
| 21.0 | 5.626933 | 5 |
| 22.0 | 5.894882 | 5 |
| 23.0 | 6.162831 | 6 |
| 24.0 | 6.430781 | 6 |
| 25.0 | 6.698730 | 6 |
| 26.0 | 6.966679 | 6 |
| 27.0 | 7.234628 | 7 |
| 28.0 | 7.502577 | 7 |
| 29.0 | 7.770527 | 7 |
| 30.0 | 8.038476 | 8 |
| 31.0 | 8.306425 | 8 |
| 32.0 | 8.574374 | 8 |
| 33.0 | 8.842323 | 8 |
| 34.0 | 9.110273 | 9 |
| 35.0 | 9.378222 | 9 |
| 36.0 | 9.646171 | 9 |
| 37.0 | 9.914120 | 9 |
| 38.0 | 10.182069 | 10 |
| 39.0 | 10.450019 | 10 |
| 40.0 | 10.717968 | 10 |
| 41.0 | 10.985917 | 10 |

*Fig. 1* (PRIOR ART)

METHOD AND ARRANGEMENT FOR PRODUCING RASTERED COLOR SEPARATIONS AND PRINTING FORMS

BACKGROUND OF THE INVENTION

The invention refers to the field of electronic reproduction technology and is directed to a method and to an arrangement for producing rastered color separations and printing forms for multi-color printing having rasters with arbitrary raster angles and raster widths.

In a color scanner for producing rastered color separations, three primary color signals are acquired by point-by-point and line-by-line opto-electronic scanning of a color original, these color signals being converted in a color computer into the color separation signals for recording the color separations "yellow", "magenta", "cyan" and "black" of a set of color plates. A point-by-point and line-by-line recording of the four rastered color separations of a set of color plates on a recording medium occurs after a processing of the color separation signals together with raster signals. The rastered color separations of a set of color plates serve as printing forms for the multi-color printing. The superimposed printing of the printing forms inked with the inks "yellow", "magenta", "cyan" and "black" occurs in a printing press on a print carrier to form a multi-colored reproduction.

Moire patterns can occur due to the superimposed printing of the raster dots, these having a particularly disturbing effect when viewing the finished print. The visibility of Moire patterns, as is known, can be diminished in that the rasters of the individual color separations of a set of color plates are printed on top of one another turned relative to one another, for which purpose the color separations must be recorded with rasters having different raster angles. What is achieved by the turned superimposed printing of the individual rasters is that the Moire periods are either too small or too big in order to be perceived in the print by the human eye as disturbing.

The rasters of the four color separations of a set of color plates must therefore be recorded with four different raster angles. In order to obtain a Moire minimum, the color separation "yellow" is often recorded in practice with a raster angle of 0°, the color separation "magenta" is recorded with a raster angle of $-15°$, the color separation "cyan" is recorded with a raster angle of $+15°$ and the color separation "black" is recorded with a raster angle of $+45°$. These raster angles must be very strictly observed in the manufacture of the color separations, since disturbing Moire patterns can again occur, even given small angular deviations.

Raster angles other than those cited above are required when, for example, further colors are printed in addition to the four inks, when a different print medium is employed or when different screen widths are to be printed on top of one another.

German Patent 28 27 596 already discloses a method and an apparatus for producing color separations with rasters having arbitrary raster angling and raster width on the basis of point-by-point and line-by-line scanning of a color original and by point-by-point and line-by-line recording of raster dots with a recording element moving across a recording medium.

In the known method, a matrix is subdivided into a plurality of matrix elements and a raster threshold that corresponds to a tonal value is allocated to every matrix element. The raster thresholds of the matrix represent the periodically recurring basic structure for every raster mesh of the turned raster to be recorded (raster hill). The raster thresholds allocated to the individual matrix elements are deposited in a memory matrix at those respective memory locations which correspond to the position of the corresponding matrix elements within the matrix. The recording medium for the color separations is subdivided into a plurality of surface elements that are aligned in a recording direction of the recording element and transversely relative thereto. The raster dot within every raster mesh of the turned raster is composed of recorded surface elements, whereby the size of the raster dot corresponding to the tonal value to be reproduced is dependent on the plurality of exposed surface elements per raster mesh. During the recording of the rastered color separation, the raster element travels over the individual surface elements line-by-line and, dependent on the tonal values measured in the color original, a check is carried out for every surface element that is traversed to see whether it is to be exposed as part of a raster dot or not. In the check, the position of the momentarily traversed surface element within the raster mesh of the turned raster is identified in terms of coordinates and that raster threshold whose position within the matrix corresponds to the identified position of the traversed surface element in the corresponding raster mesh is called in on the basis of an appropriate addressing of the memory matrix.

The decision about a potential recording of the traversed surface element occurs by comparing the tonal value allocated to the corresponding raster mesh to the raster threshold that has been called in, whereby a recording signal is derived from the comparison which switches the recording element for recording the corresponding surface element on or not.

Although turned rasters having arbitrary raster angles and raster widths can be produced with the known method, disturbing Moire patterns can nonetheless occasionally occur.

Due to the topical quantization of the raster hill or, respectively, due to the finite bit width of the memory addresses, deviations in the raster geometry occur given raster angles that do not lead to whole-number memory addresses. When viewed over a great number of raster meshes, these deviations in fact cancel, but do lead to periodically repeating stripes that are disturbingly visible in the reproduction.

German Patent 29 29 876 already discloses a method for reducing disturbing patterns wherein random numbers are superimposed on the calculated memory addresses (address wobbling), this leading to arbitrarily modified raster dot shapes. Disturbing patterns cannot be entirely avoided with this method either in extreme cases.

SUMMARY OF THE INVENTION

It is therefore an object of the invention to specify a method and an arrangement for producing rastered color separations and printing forms having rasters with an arbitrary raster angling and raster widths with which the known methods are improved to the effect that the formation of disturbing patterns is now nearly precluded.

According to the invention, the respective raster angle ($\beta$) is subdivided into a first sub-angle ($\beta_1$) whose tangent is a rational number and into a second sub-angle ($\beta_2$) whose tangent is an irrational number. First coordinate parts ($x_1'$;$y_1'$ or respectively $D_{1x}$; $D_{2y}$) of the surface elements in an orthogonal UV coordinate system oriented in the recording direction are calculated taking the first sub-angle ($\beta_1$) into consideration. Second coordinate parts ($x_2'$;$y_2'$; or respectively $D_{2x}$; $D_{2y}$) of the surface elements are calculated taking the sub-angle ($\beta_2$) into consideration in an orthogonal XY coordinate system that is aligned in the direction of the raster and describes the respective raster angle ($\beta$) with the UV coordinate system. The second coordinate parts ($x_2'$;$y_2'$ or respectively $D_{2x}$;$D_{2y}$) are randomly modified. The first coordinate parts ($x_1'$;$y_1'$ or respectively $D_{1x}$;$D_{1y}$) and the randomly modified second coordiante parts are added. The addresses (x; y) for the memory matrix are formed from the addition result.

The recited method particularly has the advantage that the quantization-caused deviations of the raster dot arrangement from the respectively prescribed raster angles occur statistically distributed and thus do not form any contours perceptible to the human eye, particularly no periodically repeating stripes.

The invention shall be set forth in greater detail below with reference to FIGS. 1 through 3.

BRIEF DESCRIPTION OF THE DRAWINGS

FIG. 1 is a table for explaining the addresses produced with the known method (prior art);

DESCRIPTION OF THE PREFERRED EMBODIMENTS

Figure 2:
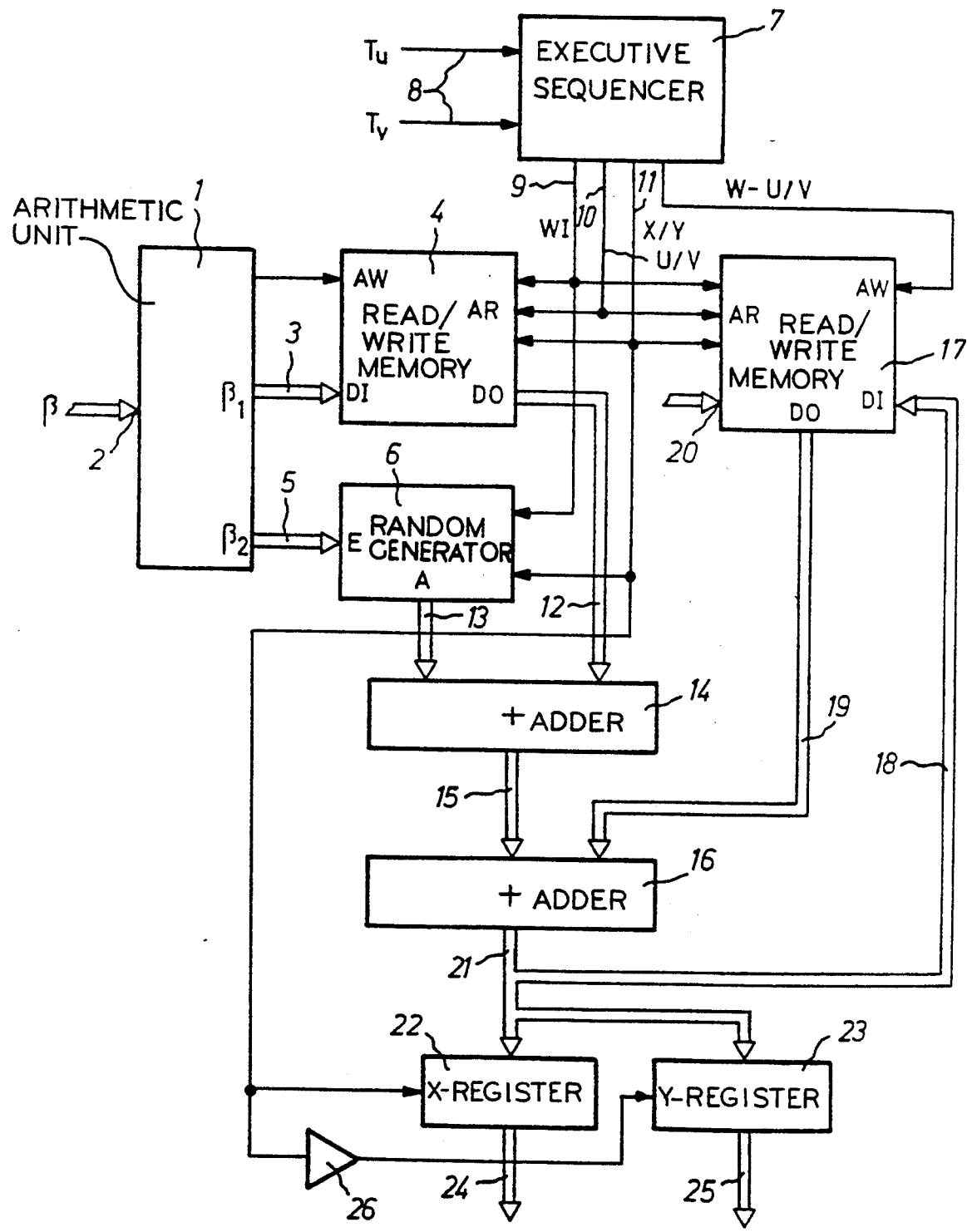
FIG. 2 is a block circuit diagram of the arrangement of the invention.

The prior art is explained with reference to FIG. 1. The invention departs on the basis of the method disclosed by German Patent 28 27 596 for producing rastered color separations and printing forms having rasters with an arbitrary raster angle and raster widths, as well as on the basis of the arrangement shown in FIG. 1 of said publication for the implementation of the method.

A raster is composed of a plurality of periodically repeating raster meshes in which raster dots of different sizes are recorded, dependent on the tonal values of an original to be reproduced. The recording medium is subdivided into a plurality of surface elements aligned in the recording direction of a recording element, these being recorded or being not recorded by the recording element. The raster dots are composed of recorded surface elements. A matrix is subdivided into a plurality of matrix elements, and a raster threshold that corresponds to a tonal value or, respectively, to an image signal value, is allocated to each matrix element. The raster thresholds of the matrix represent the basic structure (raster hill) of a raster mesh that periodically repeats in the individual raster meshes of the raster. The raster thresholds allocated to the individual matrix elements are deposited in an addressable memory matrix. During the recording, that matrix element whose position within the matrix coincides with the position of the surface element within the corresponding raster mesh is identified for every surface element on the recording medium within a raster mesh swept by the recording element. The memory location in the memory matrix corresponding to the identified matrix element is addressed and the raster threshold deposited on the addressed memory location is read out. The raster thresholds that are respectively read out are compared to the corresponding image signal values of the original. A decision is made on the basis of the comparison whether the surface elements are to be recorded or not as part of the raster dot within the respective raster mesh and corresponding control signals for shutting the recording element on or, respectively, off are produced.

The addresses (x; y) of the memory matrix are formed by a transformation of the locus coordinates (u; v) of the surface elements in a first, orthogonal UV coordinate system allocated to the recording medium, taking the respective raster angle ($\beta$) into consideration in locus coordinates (x'; y') of a second orthogonal XY coordinate system allocated to the turned raster, according to the equations (1):

$$x' = K_u \cdot u \cos \beta + K_v \cdot v \cdot \sin \beta$$
$$y' = -K_u \cdot u \cdot \sin \beta + K_v \cdot v \cos \beta; \tag{1}$$

and by modulo formation according to the equations (2):

$$x = x' \bmod x_0$$
$$y = y' \bmod y_0 \tag{2}$$

whereby "$K_u$" and "$K_v$" are scale factors and "$x_0$" and "$y_0$" represent the plurality of matrix elements in both directions of the XY coordinate system.

The locus coordinates (u; v) of the surface elements swept by the recording element can, for example, be calculated by counting prescribed basic steps $\Delta u$ and $\Delta v$ which recite the expanses of a surface element, with the assistance of clock sequences $T_u$ and $T_v$, according to equations (3)

$$u = C_u \Delta u$$
$$v = C_v \Delta v \tag{3}$$

whereby "$c_u$" and "$c_v$" are the plurality of the respectively counted clocks of the clock sequences $T_u$ and $T_v$. Subsequently, the transformation of the calculated locus coordinates (u; v) into the locus coordinates (x'; y') according to equations (1) and the calculation of the addresses by modulo formation according to equations (2) occur.

Alternatively thereto, the locus coordinates (x'; y') of the individual surface elements can be calculated by a continuous accumulation of prescribed, constant amounts $D_x$ and $D_y$ with the clock sequences $T_u$ and $T_v$. These amounts $D_x$ and $D_y$ have the form:

$$D_x = K_u \Delta u \cos \beta + K_v \Delta v \sin \beta$$
$$D_y = -K_u \Delta u \sin \beta + K_v \Delta v \cos \beta \tag{4}$$

The locus coordinates (x'; y') of a following surface element (n+1) are then calculated by addition of the amounts $D_x$ and $D_y$ according to equations (4) to the locus coordinates (x'; y') of the respectively preceding surface element (or elements) according to the equations (5)

$$x'_{(n+1)} = x'_n + D_x$$
$$y'_{(n+1)} = y'_n + D_y \tag{5}$$

and, subsequently, the modulo formation according to equations (2) is again implemented in order to obtain the addresses (x; y).

These previously explained address calculations are implemented in the transformation unit 31 in the arrangement of FIG. 1 of German Patent 28 27 596, taking the respective raster angle ($\beta$) into consideration.

FIG. 1 of the instant patent application shows the result of the address calculation according to the known method in the form of a table. The locus coordinates x; y are expressed in this table as decimal numbers and values of x' and y' respectively belonging together are shown, whereby the coordinate increments are, for example, $\Delta x'=1$ and $\Delta y'=\tan 15°$. The places preceding the decimal point correspond to the address x and y. Since $\Delta x'$ is a whole number in this example, no quantization problems thereby arise. It may be seen from the table, however, that the address y for three successive values of x is x=0. These are followed by an address x=1 for four successive steps. In a periodic sequence, three and four successive steps having the same address or, respectively, raster thresholds alternate, as a result whereof a disturbing structure derives in the recording of the raster dots. In order to avoid disturbing structures, it is provided in the method of the invention to divide the raster angle ($\beta$) into a first angle ($\beta_1$) whose tangent is a rational number and into a second angle ($\beta_2$) whose tangent is irrational, to separately implement the coordinate transformations for the angles ($\beta_1$) and ($\beta_2$), and to again accumulate the calculated coordinate parts, whereby the coordinate part identified with the angle ($\beta_2$) is only randomly taken into consideration.

FIG. 2 shows an exemplary embodiment of an arrangement for the implemention of the method of the invention that, for example, can replace the transformation unit 31 in the arrangement of FIG. 1 of German Patent 28 27 596.

In the arrangement, the calculation of the locus coordinates (x'; y') occurs, for example, by accumulation according to equations (4) and (5) and of the addresses x; y by modulo formation according to the equation (2).

The respectively required raster angles ($\beta$) are input in a CPU1 via a control input 2. The input raster angles ($\beta$) as already set forth, are divided in the CPU1 into a first angle ($\beta_1$) whose tangent is a rational number and into a second angle ($\beta_2$) whose tangent is an irrational number. For example, $\beta_1 = \arctan(4/15)$ and $\beta_2 = 15° - \beta_1$ derive for a raster angle $\beta = \beta_1 + \beta_2 = 15°$.

Whereas the "rational" angle ($\beta_1$) is supplied to the data input D1 of a read/write memory 4 as a 32 bit-wide signal via a data line 3, the "irrational" angle ($\beta_2$) proceeds to the input E of a random generator 6 via a data line 5, likewise as a 32 bit-wide signal. The read/write memory 4, for example, has a size of 16×32 bits and has an address input AW for writing, an address input AR for reading, a data output DO, as well as the data input D1. Amounts $D_{1x}$ and $D_{1y}$ according to the equations (6) are effectively stored in the read/write memory 4 for every possible angle ($\beta_1$).

$$D_{1x} = K_u \Delta u \cos \beta_1 + K_v \Delta v \sin \beta_1$$

$$D_{1y} = -K_u \Delta u \sin \beta_1 + K_v \Delta v \cos \beta_1 \qquad (6)$$

The following amounts $D_{2x}$ and $D_{2y}$ are calculated according to the equations (7) in the random generator (6) for the respectively input angle ($\beta_2$):

$$D_{2x} = K_u \Delta u \cos \beta_2 + K_v \Delta v \sin \beta_2$$

$$D_{2y} = -K_u \Delta u \sin \beta_2 + K_v \Delta v \cos \beta_2 \qquad (7)$$

Random amounts are also generated in the random generator 6 dependent on the calculated amounts $D_{2x}$ and $D_{2yx}$.

For synchronizing the sequences with the motion of the recording medium in relationship to the recording element, the arrangement comprises an executive sequencer 7 to which the clock sequences $T_u$ and $T_v$ are supplied via lines 8. The clock sequences are acquired in a known way by a circumference pulse generator and by a clock generator that are set forth in greater detail in said German Patent 28 27 596. Each clock of the clock sequence $T_u$ respectively signals a basic step $\Delta u$ in a circumferential direction of the recording drum that carries the recording medium. Every clock of the clock sequence $T_v$ signals a revolution of the recording drum and, thus, a basic step $\Delta v$ in a feed direction of the recording element. Various control signals are generated in the executive sequencer 7, namely a signal W1 on a line 9 that is two bits wide and states which of a plurality of raster angles are to be selected, and a signal U/V on a line 10 that indicates whether a processing step occurs in a circumferential direction or in a feed direction. Further, a signal X/Y is acquired on a line 11 that controls the sequential or, respectively, time-multiplex calculation of the locus coordinates x'; y' as well as a further signals W— U/V.

Such a sequential calculation is possible because only the locus coordinate x' in the circumferential direction changes during the recording of an image line (circumferential line), whereas the locus coordinate y' need only be changed given a change of image line after a revolution of the recording drum.

For calculating the locus coordinate x', the amount $D_{1x}$ is read out from the read/write memory 4 and the random amount is read out from the random generator 6 and are supplied via data lines 12; 13 to an adder 14 that adds the amount $D_{1x}$ and the random amount to form a total amount $D_x$.

The total amount $D_x$ is supplied via a data line 15 to a further adder 16 that, together with a second read-write memory 17 forms an accumulator, in that the output of the adder 16 is connected via a data line 18 to the data input D1 of the read-write memory 17 and the data output DO of the read-write memory 17 is connected via further data line 19 to the second input of the adder 16. Starting values are input into the read-write memory 17 via an input 20. The locus coordinates x' are formed as 32 bit values in the accumulator 16; 17 by continuous accumulation of the total amount Dx according to equations (5). By stripping bits—this corresponding to the modulo formation according to equations (2)—and by leaving the places following the decimal point out of consideration, six bit values are formed from the locus coordinates x', these six bit values being written into an X-register 22 as addresses x via a data line 21.

As already mentioned, the calculation of the locus coordinates y' is implemented sequentially with the calculation of the locus coordinates x'. It sequences in analogous fashion. The amount $D_{1y}$ is read out from the read-write memory 4 and the corresponding random amount is called in from the random generator 6 and are combined to the total value $D_y$ in the adder 14. By accumulation of the total value $D_y$, the ongoing locus coordinates y′ and—therefrom—the addresses y are calculated, these being written into a Y-register 23 via a data line 21. The random amounts can be acquired in the random generator 6, for example by random modification of the calculated amounts $D_{2x}$ or, respectively, $D_{2y}$, whereby the random amounts are added the amounts $D_{1x}$ or, respectively, $D_{1y}$ in the adder 14. Alternatively thereto, the random amounts can also be acquired in that the calculated amounts $D_{2x}$ or, respectively, $D_{2y}$ are randomly added or not added to the amounts $D_{1x}$ or, respectively $D_{1y}$. Advantageously, the averages of the random amounts correspond to the calculated amounts $D_{2x}$ and $D_{2y}$. When, for example, the addition and non-addition occur with a 50% distribution, the amounts to be randomly added are selected twice as large as the calculated amounts $D_{2x}$ and $D_{2y}$ in order to achieve the average.

In this way, a randomly distributed approximation is achieved in the calculation of the locus coordinates, as a result whereof the periodicity in the address table that shows the prior art in FIG. 1 is broken and disturbing pattern formations in the raster reproduction are avoided.

The arrangement described in FIG. 2 is provided for the employment of a recording element having a recording beam. The arrangement must be correspondingly expanded given a multi-track recording element.

Figure 3:
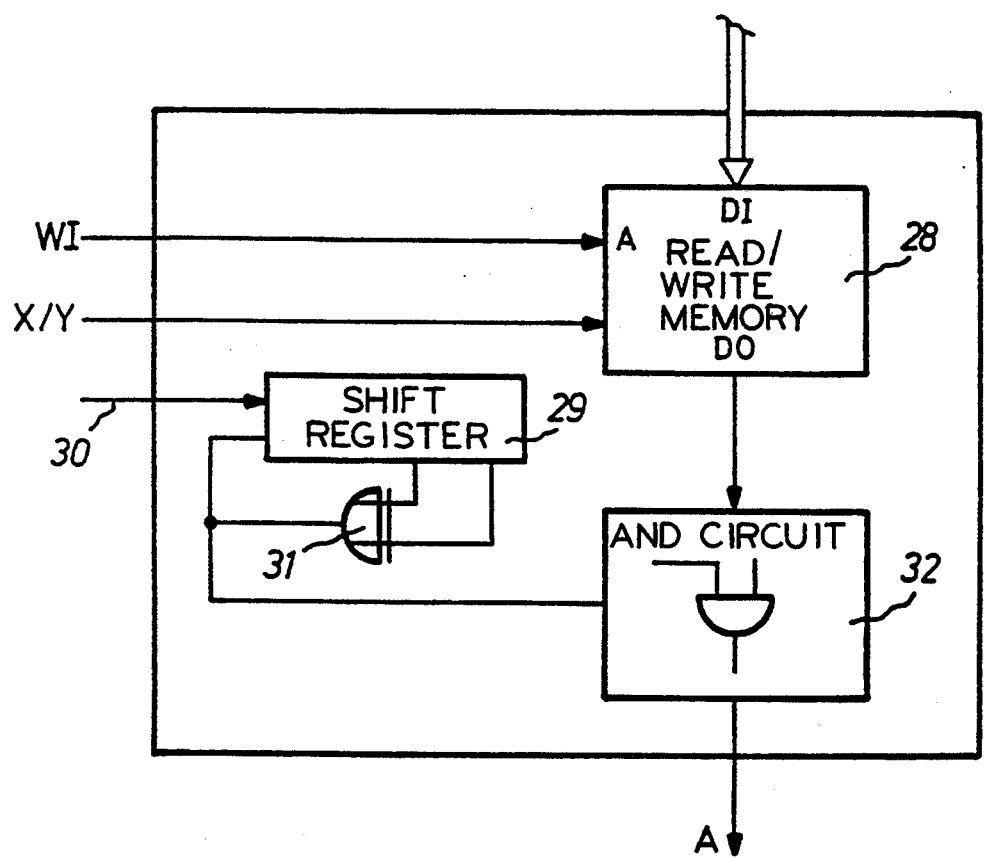
FIG. 3 is a block circuit diagram of the random generator.

FIG. 3 shows an exemplary embodiment of a random generator with which the random amounts can be arbitrarily added or not added. The random amounts are written into a read-write memory 28 via a data input D1, this memory 28 having, for example, a capacity of 8×32 bits. A shift register 29 is clocked by a clock signal supplied at 30. The signals at two selected outputs $D_i$ and $D_k$ are conducted to an exclusive-OR circuit 31 whose output is connected to the input S1 of the shift register 29. Given a suitable selection of the outputs $D_i$ and $D_k$, pseudo-randomly distributed pulses arise at the output of the exclusive-OR circuit. These pulses are supplied to an input of a 32-fold AND circuit 32, so that the prescribed values read out from the read-write memory 28 that have a bit width 32 are present at the output A, dependent on the randomly generated pulses.

Although various minor changes and modifications might be proposed by those skilled in the art, it will be understood that I wish to include within the scope of the patent warranted hereon all such changes and modifications as reasonably come within my contribution to the art.

I claim:

1. A method for producing rastered printing forms having rasters with arbitrary raster angles and raster widths with a recording element moving relatively across a recording medium, and wherein the recording medium is sub-divided into a plurality of surface elements, and wherein raster dots are composed of the surface elements recorded by the recording element, comprising the steps of:

sub-dividing a respective raster angle of a raster printing form to be reproduced into a first sub-angle whose tangent is a rational number and into a second sub-angle whose tangent is an irrational number;

calculating first coordinate parts of surface elements of the recording medium in an orthogonal first coordinate system oriented in a recording direction thereof taking the first sub-angle into consideration, and calculating second coordinate parts of the surface elements taking the second sub-angle into consideration in an orthogonal second coordinate system aligned in a direction of a raster of the printing form being produced;

randomly modifying the second coordinate parts;

adding the first coordinate parts and the randomly modified second coordinate parts;

addressably storing in a memory matrix raster thresholds representing a periodic basic structure of a raster mesh of the raster;

calculating addresses for the memory matrix for coordinate values of the surface elements on the recording medium swept by the recording element, the addresses for the memory matrix being formed from a result of the addition of the first coordinate parts and the randomly modified second coordinate parts; and outputting raster thresholds called in by the calculated addresses in the memory matrix and comparing raster thresholds being output to image signal values so that a decision is made on a basis of a comparison whether the surface element is recorded or not as part of a raster dot.

2. A method according to claim 1 wherein averages of said random modifications correspond to said second coordinate parts.

3. A method according to claim 1 wherein the second coordinate parts are added or not added on a random basis.

4. A method according to claim 1 including the further steps of:

calculating the first coordinate parts from coordinate values in the first coordinate system of the surface according to the equations:

$$x'_1 = K_u u \cos \beta_1 + K_v v \sin \beta_1$$

$$y'_1 + K_u u \sin \beta_1 + K_v v \cos \beta_1$$

and calculating the second coordinate parts according to the equations:

$$y'_2 + K_u u \cos \beta_2 + K_v v \sin \beta_2$$

$$y'_2 + -K_u u \sin \beta_2 + K_v v \cos \beta_2$$

wherein $K_u$ and $K_v$ are scaling factors, $\beta_1$ and $\beta_2$ are said first and second sub-angles, $x'_1$ and $y'_1$ are said first coordinate parts, $x'_2$ and $y'_2$ are said second coordinate parts, and u and v are coordinate values of the first coordinate system; and adding the first coordinate parts and the randomly modified second coordinate parts in order to obtain coordinate values of said second coordinate system.

5. A method according to claim 4 including the step of calculating the first coordinate system coordinate values of the surface elements by counting basic steps $\Delta u$, $\Delta v$ which correspond to an expanse of a surface element in the first coordinate system.

6. A method according to claim 4 including the step of calculating the first coordinate system coordinate values of the surface elements by continued accumulation of basic steps $\Delta u$, $\Delta v$ which correspond to an expanse of a surface element in the first coordinate system.

7. A method according to claim 1 including the further steps of:

calculating the individual surface elements by a continuous accumulation of prescribed constant amounts $D_x$ and $D_y$ with clock sequences $T_u$ and $T_v$;

forming the first coordinate parts $D_{1x}$, $D_{1y}$ according to the equations:

$$D_{1x} = K_u \Delta u \cos \beta_1 + K_v \Delta V \sin \beta_1$$

$$D_{1y} = -K_u \Delta u \sin \beta_1 + K_v \Delta v \cos \beta_1$$

and forming the second coordinate parts $D_{2x}$, $D_{2y}$ according to the equations:

$$D_{2x} = K_u \Delta u \cos \beta_2 + K_v \Delta V \sin \beta_2$$

$$D_{2y} = -K_u \Delta u \sin \beta_2 + K_v \Delta v \cos \Delta_2$$

wherein $\Delta u$ and $\Delta v$ correspond to an expanse of a surface element in the first coordinate system, $\beta_1$ and $\beta_2$ correspond to the first and second sub-angles, and $K_u$ and $K_v$ are scale factors;

adding the first coordinate parts $D_{1x}$, $D_{1y}$ and the randomly modified second coordinate parts $D_{2x}$, $D_{2y}$ in order to obtain total coordinate parts $D_x$, $D_y$; and calculating the coordinate parts of the second coordinate system $x'$, $y'$ of each following surface element $n+1$ in the second coordinate system by continuous accumulation of the total coordinate parts $D_{x'}$, $D_y$ to the coordinate parts $x'$, $y'$ of a respectively preceding surface element and according to the equations:

$$x'(n+1) = x'_n + D_x$$

$$y'(n+1) = y'_n + D_y.$$

8. A method according to claim 1 including the steps of calculating addresses x, y of the memory matrix from the coordinate values $x'$, $y'$ by modulo formation according to the equations:

wherein $x_0$, $y_0$ are the plurality of memory elements in both directions of the second coordinate system.

9. A method according to claim 1 including the step of sequentially implementing calculation of the second coordinate system coordinate values $x'$ and the coordinate values $y'$.

10. A system for producing rastered printing forms with rasters having arbitrary raster angles and raster widths with a recording element moving relatively over a recording medium, the recording medium being subdivided into a plurality of surface elements and wherein raster dots are composed of the surface elements are recorded by the recording element, comprising:

a memory matrix for addressable deposit of raster thresholds which represent a periodic basic structure of a raster mesh of the raster;

a coordinate transformation unit connected to the memory matrix for calculating addresses for the memory matrix from coordinate values of the surface elements on the recording medium swept by the recording element taking a respective raster angle into consideration;

a comparator whose inputs are connected with a raster threshold readout from the memory matrix and with image signal values acquired by point-by-point and line-by-line optoelectronic scanning of an original and whose output is connected to the recording element, said comparator comparing raster thresholds and image signal values so that a decision is respectively made on a basis of a comparison as to whether a surface element is recorded as a part of a raster dot or not;

said coordinate transformation unit comprising an arithmetic unit for subdividing the respective raster angle into a first sub-angle whose tangent is a rational number and into a second sub-angle whose tangent is an irrational number;

a first read-write memory connected to the arithmetic unit for identification of first coordinate parts of a second orthogonal coordinate system aligned in a direction of the raster from coordinate values of the surface elements in a first orthogonal coordinate system oriented in a recording direction and describing the respective raster angles with the second coordinate system, the identification of the first coordinate parts taking the first sub-angle into consideration;

a random generator connected to the arithmetic unit for calculating second coordinate parts of the second coordinate system from coordinate values of the first coordinate system taking said second sub-angle into consideration, and for randomly modifying the calculated second coordinate parts of the second coordinate system;

an adder connected to a respective output of said first read-write memory and of said random generator for addition of said first coordinate parts of said second coordinate system and the randomly modified second coordinate parts of said second coordinate system to form total amounts;

an accumulator connected to an output of the adder for formation of second coordinate system coordinate values from said total amounts by accumulation and for calculating addresses for said memory matrix; and a register connected to an output of the accumulator for deposit of said addresses for the memory matrix.

* * * * *